United States Patent Office 2,947,632
Patented Aug. 2, 1960

2,947,632
PREPARATION OF A MOLASSES FEED
Norman F. Kruse, Decatur, Ind., assignor to Central Soya Company, Inc., Fort Wayne, Ind., a corporation of Indiana
No Drawing. Filed Jan. 12, 1956, Ser. No. 558,621
7 Claims. (Cl. 99—6)

This invention relates to the preparation of a molasses feed, and more particularly to a feed in which molasses is combined with meal, grain, or other common feed ingredients, the resulting product being in the form of a pellet feed.

The present application is a continuation-in-part of my copending application, Serial No. 338,589, filed February 24, 1953 (now abandoned).

The addition of molasses to a meal feed ingredient is highly desirable because by this means a cheap source of carbohydrate material is utilized with the meal, and further, through the preparation of pellets, there is less loss of feed by reason of fines or dust-like portions of the feed escaping from containers, bins, feed troughs, etc.

A problem has long been presented in the adding of liquid molasses to a feed ingredient and the preparation of pellets therefrom. It is found that the adding of the wet molasses to the mixture brings about a balling tendency and produces a sticky mixture which conveys with great difficulty. The mixture does not flow from bins, and the resulting pellet is soft and wet and tends to crumble to form fines and sets up during storage to a hard mass.

By way of example, when it is attempted to combine 13% of molasses with meal, such as cottonseed meal, gluten feed, soybean meal and similar common constituents of feed, it is found that the material tends to flow very poorly, and it is difficult to punch the material from the soft feed bin so as to cause it to flow into the pelleting machine. In the pelleting machine, an extremely low rate of production must be followed because of the sticky character of the product, and the difficulty of moving it through the pelleting machine. The final product is soft and wet, tending to crumble readily and producing small particles and fines. Continued drying of the wet material tends to break up the pellets still further. There has long been a need for a method or means whereby molasses could be combined in substantial quantities with feed meals or ingredients and rapidly formed into pellets which remain hard and possess a dense structure.

An object of the present invention is to provide a method and means of overcoming the above described difficulties and producing the desired dense pellet product. A further object is to provide a process which will produce a dense pellet product of greater molasses content, having improved properties with respect to uniformity, firmness, resistance to breakage, smooth surfaces, etc., while at the same time more than doubling the production rate of the pelleting machine. Yet another object is to provide a new process for producing pelleted molasses-containing feeds at economical production rates and yielding a product of dense and stable character. Other specific objects and advantages will appear as the specification proceeds.

In one embodiment of my process, molasses is added to a meal carrier, the liquid molasses thoroughly penetrating the meal, and the resultant granular material is dried to a condition at which it flows readily. Steam is then introduced into the dried material containing molasses so as to distribute a thin layer of moisture on the surface of the particles to lubricate them, and the material is then fed through a pelleting machine. The process enables one to incorporate a greater amount of molasses in the product while at the same time the intermediate product is flowable and can be conveyed and handled through bins, and finally processed through the pelleting machine at a greatly increased rate of production to produce pellets which are dense and firm and which do not crumble and disintegrate as do the pellets produced through the feeding of wet molasses with meal to the pelleting machine.

As an example, I apply to an organic carrier desired as a constituent of the feed, such a soybean meal, cottonseed meal, sunflower seed meal, sesame seed meal, various mill feeds, etc., a desired amount of molasses, such as, for example, 12% to 15% of molasses. The mixture is passed through a dryer to dry the molasses in the outer portion of the meal particles. The treated meal is then cooled, ground, and may be then fed through a pelleting machine. Alternatively, the cooled and ground meal may be mixed with other ingredients of the feed such as other portions of the same meals or with ground corn, pulverized oats, alfalfa, corn gluten meal, etc., and the resulting combined materials fed through the pelleting machine. In each operation, during the feeding of the material to the machine, steam is introduced into the mass so as to permeate the mass and apply surface moisture to the molasses coating, rendering the surface slippery and thus providing lubrication for the resulting compressing or pelleting operation. It is found that a small amount of molasses in liquid form may also be added, if desired, to the mix which is to be fed to the pelleting machine.

The percentage of molasses added to the meal or feed mixture is preferably 10–20%, as stated above, but a wider range can be maintained, as, for example 10–40% of molasses.

In the foregoing process, there is a marked difference between the action of the dried molasses content of the carrier meal and the action of liquid molasses when used on a similar meal. The liquid molasses tends to form balls and the pellets are soft and wet and tend to crumble. For some reason, however, the dried molasses product, even while incorporating more carbohydrates into the feed, does not ball or produce a wet pellet, but instead, gives a relatively dry mixture which is fed to the pelleting machine. The dry mixture can be conveyed and binned with greater ease and with less difficulty. At the same time, the increased pelleting rate through the machines amounts to as much as 100% to 250% or more. The pellet is greatly improved in quality with respect to firmness and resistance to breakage, and it has a desired smooth surface.

The improvements in pellet machine performance and the quality of pellet are believed to be due to having a mixing of lower moisture content in the case of the dried molasses meal product. This condition permits the addition of large quantities of live steam in the pelleting operation which rapidly raises the temperature of the feed to properly plasticize and condition it for the extrusion process. By so attaining the more optimum conditions for this process, the pelleting rate is greatly increased while at the same time obtaining desired quality improvements. In the case where the liquid molasses is used, there is already too much moisture present for satisfactory pellet machine operation, and the use of live steam for conditioning and heating is, thereby, limited so that desirable processing conditions cannot be attained. Furthermore, in the latter case, the molasses is on the surface of the particles as compared with the dried product in which a greater portion is absorbed within the meal product.

Why the new process is effective in producing the pellets at such a greatly increased rate and in the dense form described, I am unable to explain. It may be that in the drying operation the bulk of the moisture from the molasses is extracted and the relatively dry coating on the meal remains intact except for the thin application of surface moisture, with the result that the various coated particles are later combined with a minimum of moisture therein. Further, the lubricating effect of the surface moisture on the dry molasses greatly facilitates the compressing and pellet-forming operation while at the same time the heat supplied by the steam increases the plasticity of the product without causing deterioration of the strength of the particles. The formed dense pellet, having a very small moisture content therein, does not under later conditions tends to crumble or break up. Whether the explanation suggested above is accurate or not, I am not certain, but it is clear that the particles coated with dry molasses produce a free-flowing product which can be readily handled and thereafter, upon the application of steam, which apparently affects only the surface of the dry molasses films, brings about a tenacious union between the particles so that a dry, dense, well formed pellet product is produced and produced in quantities more than doubling the production heretofore attained.

Specific examples of the process may be set out as follows:

EXAMPLE I

Starting with a toasted desolventized soybean meal, produced in accordance with the description set out in my Patents No. 2,585,793 or No. 2,260,254, I distribute liquid molasses upon the toasted meal in the proportion of 12%. The liquid molasses penetrated the meal mass and coated the particles therein. The molasses-coated meal was then passed through a Louisville steam tube dryer and the moisture reduced to approximately 10–12%. The dried molasses-meal product was cooled and ground to reduce the lumps to a uniform meal size. Live steam was then introduced through a pipe into the pellet machine so as to penetrate the mass and apply surface moisture to the molasses coating, while at the same time warming the meal and plasticizing the molasses. The product was then passed through a pelleting machine at the rate of 128 bags per hour. This compared with a rate of 30 bags per hour obtained through the use of the same equipment employed for pelleting the same type of meal in which the same amount of liquid molasses was incorporated at the time the material was fed to the machine. The pellets produced by the new process were dense, hard, and uniformly formed as compared with soft pellets obtained by the wet molasses process referred to above.

EXAMPLE II

Two runs for the forming of beef concentrate pellets were made in the feed mill, one having the molasses added mostly by the process described in Example I, and the other having all wet molasses added. Regular formulas were used, and the two runs were made to determine the difference in mixing, conveying, flowability, binning and pelleting rate. The term "Sweet Soy (12)" in the following table is used to denote the product produced as described in Example I but prior to the pelleting operation.

|  | #1 Run Present Formula Using Sweet Soy (12) | #2 Run Old Formula Using All Wet Molasses |
|---|---|---|
|  | Percent | Percent |
| Cotton Seed Meal | 2 | 1 |
| Gluten Feed | 16 | 12 |
| Linseed Meal | 2 | 2 |
| Minerals | 3 | 3 |
| Molasses | 6 | 13 |
| Def. Phosphate | 5 | 5 |
| Salt | 2 | 2 |
| SBOM |  | 62 |
| Sweet Soy (12) | 64 |  |

1 lb. yeast pre mix per ton.
1 lb. 10,000 A oil per ton.

The #1 run described above was mixed and conveyed to the soft feed bin with no trouble, running 12 bags per minute, while in the #2 run, the feed line had to be closed down for cleaning out spouts which were plugged and extra help was required in conducting the run because of the plugging characteristic and the line was run at a lower rate per minute. Further, in the #2 run, it was necessary to employ extra help to punch feed out of the soft feed bin into the conveyor line leading to the pelleting machine. The two runs were conducted on identical equipment, except that it was necessary to reduce the number of knives employed in #2 run so as to prevent the pellets from being formed in too short lengths by reason of the extremely slow feed. #1 run produced 128 bags per hour, while #2 run produced 30.6 bags per hour, while the time required to make #1 run was only 42 minutes as compared with 120 minutes required for run #2. While steam was used in the #1 run for effective operation, it was found that steam could not be used in the #2 run because this created excessive moisture and produced an extremely soft pellet. Even without using steam, the pellets produced in the #2 run were soft and wet and tended rapidly to crumble as they dried.

EXAMPLE III

Soybean toasted meal was mixed with liquid molasses in the proportion of 12%, the molasses being sufficiently liquid to coat the particles of the meal. The meal was then passed through a steam tube dryer and the moisture reduced to approximately 10–12%. It is sufficient if the moisture be reduced to a point at which the material flows readily and can be readily handled in conveying and elevating equipment. The dried product was cooled, ground, and then subjected to steam, which gave a thin moisture coating to the molasses film. In addition to the molasses contained on the meal in the dry form, it was possible to add some liquid molasses on this feed product and yet maintain an effective pelleting operation. In the following example, the 12% molasses meal described above and in which the molasses coatings were dried was mixed with other meals and feed materials as described below, and this operation is compared with the operation in which the dried molasses mix was not employed and in which all of the molasses added was in the form of liquid molasses. Steam was added to the mixture containing the dried molasses coating prior to the pelleting operation, while no steam was added to the second operation in which all of the molasses was incorporated as liquid molasses.

Low Protein Dairy Feed (Pelleted)

| Ingredient | Dried molasses-Meal Feed, Percent | Liquid Molasses Feed, Percent |
|---|---|---|
| Ground Barley | 3 | 3. |
| Cottonseed Meal | 2 | 2. |
| Corn Gluten Feed | 14 | 14. |
| Malt Sprouts | 5 | 5. |
| Mineral Mix | 7 | 7. |
| Ground Grain Screenings | 31 | 30. |
| 12% Molasses-Meal Mix Dried | 25 | 0. |
| Soybean Oil Meal | 0 | 22. |
| Liquid Molasses | 13 | 17. |
| Total Molasses (Reconstituted basis) | 17 | 17. |
| Moisture of Mix | 10.8 | 13.5. |
| Protein | 20 | 20. |
| Soft Feed Mix Characteristics | Relatively dry, not sticky and conveys without difficulty. | Wet and sticky. Hinders conveying. Will not bin satisfactorily. |
| Pelleting Rate | 23,200 lbs./hr | 10,000 lbs./hr. |
| Pellet Quality | Hard, firm and smooth. | Soft and crumble easily. |

EXAMPLE IV

Comparative pelleting operations were carried out as described in Example III, the 12% molasses-meal mix in which the molasses was dried being added in the proportion of 64% in the first run, and 6% liquid molasses being added during the mixing of the other ingredients, while in the second run in which liquid molasses was added to give the entire molasses content, no steam was introduced. The details and results are set out as follows:

*High protein dairy feed (pelleted)*

| Ingredient | Dried Molasses-Meal Feed, Percent | Liquid Molasses Feed, Percent |
|---|---|---|
| Cottonseed Meal | 4 | 3. |
| Corn Gluten Feed | 16 | 12. |
| Mineral Mix | 10 | 10. |
| 12% Molasses-Meal Mix Dried | 64 | 0. |
| Soybean Oil Meal | 0 | 62. |
| Liquid Molasses | 6 | 13. |
| Total Molasses | 16.25 | 13. |
| Moisture of Mix | 10.9 | 13.1. |
| Protein | 33.28 | 33.51. |
| Soft Feed Mix Characteristics | Relatively dry, not sticky and conveys without difficulty. | Wet and sticky. Hinders conveying. Will not bin satisfactorily. |
| Pellet rate | 26,700 lbs./hr | 12,500 lbs./hr. |
| Pellet Quality | Hard, firm and smooth. | Soft and crumble easily. |

EXAMPLE V

Tests were carried out as described in Example I and the remaining examples, except that in the forming of the dry molasses-meal mix 10% of molasses was added in one instance and 35% of molasses added in another instance, with satisfactory results being produced. Best results, however, were obtained when the molasses content was maintained at about 10–20%.

The new results achieved by the foregoing process, in which a substantial portion of the mixture pelletized consisted of meal having a dried molasses content and in which steam was applied to the meal just before it was compressed or delivered to the pelleting machine, with or without additional feed materials and with or without some liquid molasses, may be set out as follows: In the first place, the product, instead of being soft and wet and tending to crumble into small particles or fines, was dense, hard, and did not tend to produce fines. Secondly, in the process operation, the dried molasses product was readily handled by the conveyor systems and pelleting systems without plugging, and permitted the use of a great amount of direct steam, which in turn gave heat and surface moisture to make the product plastic and with the surface moisture acting as a lubricant so that production rates were increased as much as 100% to 250% and more.

While, as set out in some of the foregoing examples, the moisture content of the molasses-coated meal after drying was approximately 8–11% or 10–12%, the content will vary. I find it desirable to dry the products with higher molasses content to lower final moistures. For example, a molasses-coated meal containing 40% liquid mosasses is dried to 8%, while a similar product containing 35% molasses is dried to 9% moisture, and a product containing 20% molasses is dried to 10% moisture.

The amount of steam may, if desired, be defined in terms of temperature. This may be set out in the range of 140–190° F. for the temperature of the feed to the pelleting machine, with a preferred range of 165–175° F. As indicated in the runs described in the preceding examples in which steam was used, the amount of steam added in the tables could be shown as 800–1200 lbs. per hour. The steam is introduced into the pelleting machine or into the feed conveyor for the pelleting machine to wet the surface of the exposed dried molasses film, and the heat derived from the steam not only gives the molasses film plasticity and adhesiveness, but also makes the carrier take on these characteristics.

While, in the foregoing processes, I have set forth specific steps in considerable detail for the purpose of illustrating embodiments of the invention, it will be understood that such details of procedure or formula ingredients may be varied widely by those skilled in the art without departing from the spirit of my invention.

I claim:

1. In a process for forming a molasses-containing pelleted feed, the steps of mixing liquid molasses with a feed meal, drying the mixture to a moisture content at which the meal is free flowing, introducing live steam into the material to wet the exposed surfaces of the material, and pressing the material to form pellets.

2. The process of claim 1, in which the liquid molasses is mixed in the proportion of about 10–40% by weight.

3. The process of claim 1, in which the liquid molasses is mixed in the proportion of about 10–20% by weight.

4. In a process for forming a molasses-containing pelleted feed, the steps of mixing liquid molasses in the proportion of about 10–20% by weight with a feed meal, drying the mixture to a moisture content of about 8–22%, grinding the material, introducing steam into the material to wet the exposed surfaces of the molasses, and pressing the material into pellets.

5. In a process for forming a molasses-containing pelleted feed, the steps of incorporating in a feed meal liquid molasses to cause said molasses to penetrate the meal and coat the particles thereof, drying the mixture to a moisture content at which the material is free flowing, adding liquid molasses to the mixture, applying live steam to the mixture to wet the exposed dried molasses surfaces, and pressing the mixture into pellets.

6. The process of claim 5, in which additional feed ingredients are added to the mixture just before the application of steam thereto.

7. In a process for forming a molasses-containing pelleted meal, the steps of mixing liquid molasses in the proportion of about 10–20% by weight with toasted desolventized extracted soybean meal, drying the mixture to a moisture content of about 8–11%, cooling and grinding the mixture, adding the mixture to other feed ingredients, applying steam to the combined material to moisten the exposed molasses surfaces therein, and compressing the material into pellets.

References Cited in the file of this patent

UNITED STATES PATENTS

| | | |
|---|---|---|
| 1,877,266 | Chapin et al. | Sept. 13, 1932 |
| 2,168,532 | McMath et al. | Aug. 8, 1939 |
| 2,197,319 | Sargent | Apr. 16, 1940 |